(12) United States Patent
Castro-Cabado et al.

(10) Patent No.: US 9,242,899 B2
(45) Date of Patent: Jan. 26, 2016

(54) FORMALDEHYDE-FREE BINDER AND USE FOR MINERAL WOOL INSULATION PRODUCTS

(71) Applicant: URSA INSULATION, S.A., Madrid (ES)

(72) Inventors: Maria Mercedes Castro-Cabado, Madrid (ES); Arturo Luis Casado Dominguez, Madrid (ES); Ana Isabel Aznar Ecija, Tarragona (ES); Marc Pi Macias, Torredembarra (ES); Alejandro Molinero Arenas, Madrid (ES)

(73) Assignee: URSA INSULATION, S.A., Madrid (ES)

( * ) Notice: Subject to any disclaimer, the term of this patent is extended or adjusted under 35 U.S.C. 154(b) by 0 days.

(21) Appl. No.: 14/410,712

(22) PCT Filed: Jun. 28, 2013

(86) PCT No.: PCT/EP2013/063660
§ 371 (c)(1),
(2) Date: Dec. 23, 2014

(87) PCT Pub. No.: WO2014/001518
PCT Pub. Date: Jan. 3, 2014

(65) Prior Publication Data
US 2015/0321958 A1 Nov. 12, 2015

(30) Foreign Application Priority Data

Jun. 29, 2012 (EP) .................................... 12174362

(51) Int. Cl.
| | | |
|---|---|---|
| *C08L 3/02* | (2006.01) | |
| *C04B 26/28* | (2006.01) | |
| *C04B 26/04* | (2006.01) | |
| *C04B 40/00* | (2006.01) | |
| *E04B 1/74* | (2006.01) | |
| *C09J 133/08* | (2006.01) | |
| *C08L 33/08* | (2006.01) | |
| *C04B 26/06* | (2006.01) | |
| *C09J 103/02* | (2006.01) | |
| *C04B 111/52* | (2006.01) | |
| *C04B 111/10* | (2006.01) | |

(52) U.S. Cl.
CPC ................ *C04B 26/04* (2013.01); *C04B 26/06* (2013.01); *C04B 26/285* (2013.01); *C04B 40/0082* (2013.01); *C08L 3/02* (2013.01); *C08L 33/08* (2013.01); *C09J 103/02* (2013.01); *C09J 133/08* (2013.01); *E04B 1/74* (2013.01); *C04B 2111/1006* (2013.01); *C04B 2111/52* (2013.01); *C08L 2201/54* (2013.01); *C08L 2312/00* (2013.01)

(58) Field of Classification Search
CPC ....... C08L 3/02; C08L 33/08; C08L 2312/00; C08L 2201/54; C09J 103/02; C09J 133/08; C04B 26/06; C04B 26/28; C04B 26/285; C04B 2111/1006
See application file for complete search history.

(56) References Cited

U.S. PATENT DOCUMENTS

| | | | |
|---|---|---|---|
| 5,318,990 A | 6/1994 | Strauss | |
| 5,346,688 A * | 9/1994 | Bacon | C07C 233/54 424/9.45 |
| 5,661,213 A * | 8/1997 | Arkens | C08F 8/14 524/555 |
| 5,763,524 A | 6/1998 | Arkens et al. | |
| 5,932,689 A * | 8/1999 | Arkens | C03C 25/26 524/538 |
| 5,977,232 A * | 11/1999 | Arkens | C08K 3/32 524/404 |
| 6,071,994 A | 6/2000 | Hummerich et al. | |
| 6,099,773 A * | 8/2000 | Reck | B27N 3/00 156/296 |
| 6,136,916 A | 10/2000 | Arkens et al. | |
| 6,146,743 A * | 11/2000 | Haq | A61N 1/02 174/257 |
| 6,221,973 B1 * | 4/2001 | Arkens | C08F 8/14 525/327.7 |
| 6,331,350 B1 | 12/2001 | Taylor et al. | |
| 8,591,643 B2 | 11/2013 | Obert et al. | |
| 8,864,893 B2 * | 10/2014 | Hawkins | C03C 25/1095 106/206.1 |
| 2002/0091185 A1* | 7/2002 | Taylor | C08F 8/14 524/249 |
| 2002/0188055 A1* | 12/2002 | Chen | C03C 25/285 524/494 |
| 2003/0008978 A1* | 1/2003 | Chen | C08F 8/14 525/329.7 |

(Continued)

FOREIGN PATENT DOCUMENTS

| | | |
|---|---|---|
| CN | 101081742 A | 12/2007 |
| DE | 4344670 A1 | 6/1995 |

(Continued)

OTHER PUBLICATIONS

International Preliminary Report on Patentability, dated Aug. 29, 2014, with respect to International Application No. PCT/EP2013/063660.

(Continued)

*Primary Examiner* — David M Brunsman
(74) *Attorney, Agent, or Firm* — Scott R. Cox

(57) ABSTRACT

The present invention relates to a new formaldehyde-free binder composition for mineral wool products, wherein the binder composition is an aqueous composition containing starch, wherein an amount of 95 weight % or more of the starch is water-insoluble native starch, and an acrylic component. The present invention also relates to the use of this formaldehyde-free binder composition in the manufacturing of mineral wool insulation products. Finally, the present invention relates to a process for manufacturing the formaldehyde-free binder composition wherein a dispersion of starch, wherein an amount of 95 weight % or more of the starch is water-insoluble native starch, is brought in contact with the acrylic component at a temperature of not higher than 40° C.

11 Claims, 5 Drawing Sheets

(56) References Cited

U.S. PATENT DOCUMENTS

| | | | |
|---|---|---|---|
| 2004/0002567 A1* | 1/2004 | Chen | C03C 25/285 524/494 |
| 2005/0215153 A1* | 9/2005 | Cossement | C03C 25/246 442/180 |
| 2008/0108741 A1 | 5/2008 | Van Herwijnen et al. | |
| 2010/0029160 A1 | 2/2010 | Srinivasan et al. | |
| 2010/0326614 A1 | 12/2010 | Hund et al. | |
| 2011/0260094 A1 | 10/2011 | Hampson et al. | |

FOREIGN PATENT DOCUMENTS

| | | |
|---|---|---|
| EP | 0659928 A2 | 6/1995 |
| EP | 1397554 A2 | 3/2004 |
| GB | 1016105 | 1/1966 |
| JP | 2002294595 A | 10/2002 |
| WO | WO2008053332 A1 | 5/2008 |
| WO | WO2008089851 A1 | 7/2008 |
| WO | WO2009019232 A1 | 2/2009 |
| WO | WO2010139899 A1 | 12/2010 |
| WO | WO2011002730 A1 | 1/2011 |
| WO | WO2011044490 A1 | 4/2011 |

OTHER PUBLICATIONS

English translation of Japanese Patent Office Action, dated Oct. 13, 2015, with respect to Japanese Patent Application 2015-519136. This application is a related application to the current US Application.

* cited by examiner

FORMALDEHYDE-FREE BINDER AND USE FOR MINERAL WOOL INSULATION PRODUCTS

This application is a 371 national stage entry of PCT/EP2013/063660, filed Jun. 28, 2013.

FIELD OF THE INVENTION

The present invention relates to formaldehyde-free resins and their use in the manufacture of mineral wool insulation products of zero formaldehyde emissions.

STATE OF THE ART

The mineral wool products have traditionally being manufactured by adhering mineral fibers by means of phenol-formaldehyde resins, profiting from relatively low costs and good mechanical properties, stability and water resistance granted to the finished products. Most common phenol-formaldehyde resins for mineral wool production are resols manufactured by condensation of formaldehyde and phenol catalyzed by alkalis and using a large molar excess of the formaldehyde.

The main drawback of the used phenol-formaldehyde resins is the slow release of formaldehyde in finished products to the environment, contributing to worsen the indoor air quality; hence the interest of formaldehyde-free resins for mineral wool products. Different alternative resins have been described in the art.

One alternative to the use of phenol-formaldehyde resins in mineral wool production are the polyester resins based on carboxylated polymers. Most common ones contain a combination of one acrylic (co)polymer and one low molecular weight polyol. The resin cures at high temperatures under acidic conditions via the formation of ester-bonds. For instance EP 583 086 (U.S. Pat. No. 5,763,524), EP 0 990 729 A1 (U.S. Pat. No. 6,331,350), U.S. Pat. No. 6,136,916 and U.S. Pat. No. 6,221,973 [Rohm&Haas] describe the use of polyacrylic acid and either hydroxylamines (such as triethanolamine) or glycerol as cross-linkers. U.S. Pat. No. 5,318,990 [Owens Corning] teaches the use of polycarboxylic polymer and glycerol or trimethylolpropane. U.S. Pat. No. 6,331,350 [Johns Manville] describes a binder consisting of polycarboxylic polymer and polyol such as triethanolamine, at a pH not greater than 3.5. Another group of binders contain resins based on co-polymers of acrylic acid. For instance, U.S. Pat. No. 6,071,994 [BASF] describes the use of copolymers based on acrylic and maleic acids, and polyols as cross-linkers at a pH lower than 3.5. US 2010/0029160 [Georgia Pacific] teaches the use of hydrolyzed copolymer of maleic anhydride and a vinyl compound such as styrene and a monomeric polyol as cross-linker, at a pH of more than 7. The acrylic resins above confer excellent mechanical properties to the mineral wool products. Unfortunately, the costs of these resins are about two to three-fold higher than the conventional phenolic-based resins, this being a significant drawback for their use in industry. Additionally, acrylic resins normally have the processing disadvantage of a relatively high viscosity which limits the use for manufacturing high density mineral wool products.

Another important group of formaldehyde-free resins found in the art refers to bio-resins based on carbohydrates and low molecular weight poly-acid, such as citric acid, as cross-linker. The resins cure at high temperatures under acidic conditions via, in most cases, the formation of ester-bonds. In general, it is preferred the use of carbohydrates soluble in water to facilitate the processing and the curing of the resins. One representative group is based on sugars. For instance WO 2009/19232 and US 2011/260094 [Knauf] describe a binder based on the Maillard type reaction composed of a reducing sugar, acid precursor derivable from an inorganic salt and a source of nitrogen. WO 2012/028810 [Isover] describes a binder composition consisting of non-reducing sugar such as glucose and one inorganic acid metal salt. WO 2010/139899 [Isover] describes a binder composition consisting of saccharide such as glucose and polycarboxylic acid. A second representative group consists of a combination of dextrins derived upon chemical or enzymatic treatment of native starches. For instance, US 2005/0215153 A1 [Ovens Corning] teaches the use of dextrin in combination with cross-linkers. WO 2011/044490 A1 teaches the use of water soluble carbohydrates having a Dextrose Equivalent (DE) between 2 and in combination with cross-linkers. WO 2011/002730 A1 describes the use of modified starches with a degree of polymerization between 20 and 4000 units, in combination with cross-linkers. In this group of patent applications, it is claimed that the dextrination to obtain water soluble modified starches favors the processability of the binder, because of the lowering of the viscosity, and an increase of the curing rate in the presence of cross-linkers. US 2008/108741 and WO 2008/053332 [Dynea] describe mixtures of water-soluble starches containing more than 80 weight % of amylopectin and a polycarboxylic acid as cross-linker. The bio-resins based on renewable polyols offer important advantages over the synthetic-resins, particularly their lower costs and better sustainability profile. Yet, these bio-resins shall be used in higher dosage on mineral fibers compared to the phenolic or acrylic resins because the mechanical properties, particularly upon aging, delivered to mineral wool are normally lower, and because of the greater mass losses due to thermal degradation during the process of curing. Indeed, the process of curing of these bio-resins requires a strict control of the temperature between narrow ranges. This is needed to achieve the suitable mechanical properties and to avoid unwanted thermal degradation.

It is an object of the present invention to provide a formaldehyde-free binder which is particularly valuable for the use in mineral wool production due to excellent binding strength, easy manufacture and low costs.

It is a further object of the present invention to provide a process for the preparation of the new formaldehyde-free binder.

SUMMARY OF THE INVENTION

The above object is solved by a formaldehyde-free aqueous binder composition comprising
  starch, wherein an amount of 95 weight % or more of the starch is water-insoluble native starch, and
  one or more acrylic component(s).

According to a preferred embodiment, the object is solved by a formaldehyde-free aqueous binder composition in the form of a dispersion, comprising starch, wherein an amount of 95 weight % or more of the starch is water-insoluble native starch, and one or more acrylic component(s), wherein the acrylic component(s) is/are selected from the group consisting of polyacrylic acid, copolymers of acrylic and maleic acids, copolymers of ethylene-unsaturated moieties containing at least 10 mol % of acrylic acid, maleic acid or maleic anhydride; salts of any preceding (co)polymers, curable resins based on any preceding (co)polymers, and mixtures thereof.

Another object of the present invention is to provide a mineral wool product comprising a cured formaldehyde-free binder obtainable by the following process steps:

impregnating mineral fibers of a binder-free mineral wool product with an aqueous binder composition in the form of a dispersion comprising a) starch, wherein an amount of 95 weight % or more of the starch is water-insoluble native starch; and b) one or more acrylic component(s), selected from the group consisting of polyacrylic acid, copolymers of acrylic and maleic acids, copolymers of ethylene-unsaturated moieties containing at least 10 mol % of acrylic acid, maleic acid or maleic anhydride; salts of any preceding (co)polymers, curable resins based on any preceding (co)polymers, and mixtures thereof, wherein the mineral fibers are impregnated via spraying the aqueous binder composition with a solid content of 4 to 10 weight %, and curing the aqueous binder composition at a temperature above 100° C.

The inventors have surprisingly found three synergic effects between native starch being water insoluble and the acrylic component, such as acrylic resin or acrylic (co)polymers, which makes the new formaldehyde-free binder of the present invention most suitable as a binder for mineral wool:

Firstly, the binding strength granted to mineral fibers by the mixture is maintained or even enhanced in comparison to acrylic binders. The later is particularly seen under stress 'wet' conditions, which are predictable of the behavior of the new binders upon aging. Hence the mixture of these two components exceptionally improves the 'cost per job' and the sustainability of the new binder.

Secondly, the viscosity and stability of the new binder is very suitable despite of the insolubility of the native starch component, due to the dispersing and stabilizing effect that the acrylic component exerts on the native starch. This enables the production of binder dispersions of low viscosity very suitable for further application to mineral fibers by spray-on process.

Thirdly, the curing of the new binder can be done at reduced temperatures in comparison to other bio-resins based on high DE carbohydrates like dextrins or sugars, what results in a considerable energy saving. An additional advantage over the bio-resins based on high DE carbohydrates like dextrins or sugars, is that the curing process of the new binder does not require a strict control of the temperature. This is because the mass loss by thermal degradation of the new resin during the curing is negligible. Indeed, the mineral wool product made with the new binder has a characteristic whitish color instead of brownish color of products made with above mentioned bio-resins.

Composition of the New Binder

Figure 1:
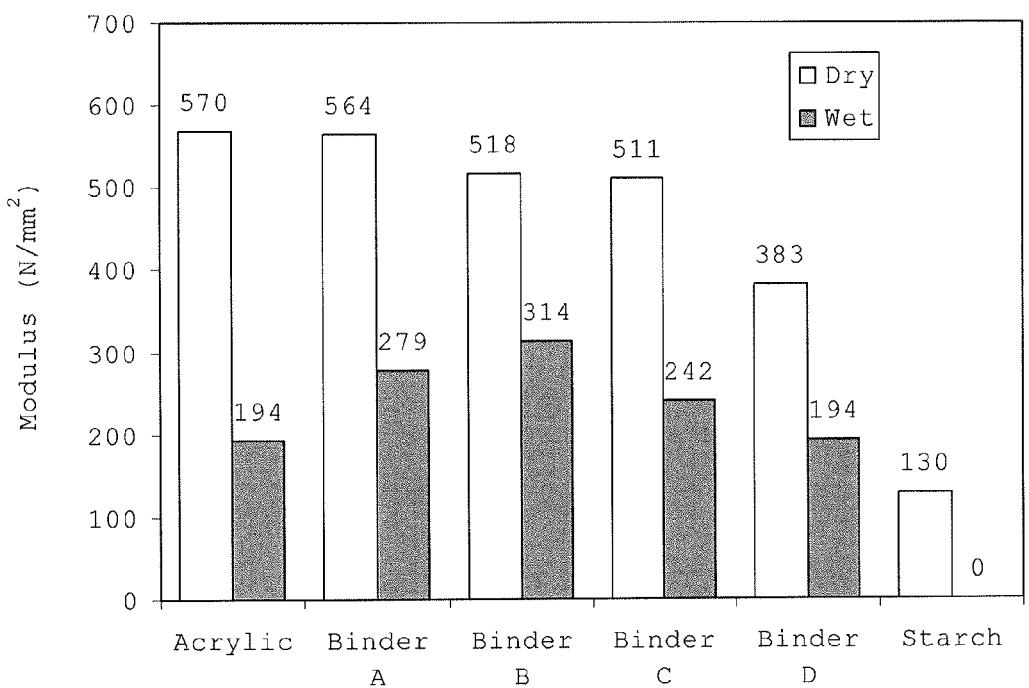
FIG. 1 shows the bonding properties of binders A to D according to the present invention, native starch Meritena 120 and acrylic resin Aquaset BI700.

According to the present invention, the new formaldehyde-free binder is an aqueous composition containing at least one starch, wherein an amount of 95 weight % or more of the starch is water-insoluble native starch, and one or more acrylic component(s). This means that the new formaldehyde-free binder of the present invention contains at least one starch wherein 95 to 100 weight % of the starch is water-insoluble native starch, and one or more acrylic component(s). Preferentially the formaldehyde-free binder is an aqueous composition comprising at least one starch, wherein 99 or 100 weight % or an amount ranging between these two values of the starch is water-insoluble native starch, and one or more acrylic component(s).

The binder composition of the present invention is 'formaldehyde-free'. The term 'formaldehyde-free' in the sense of the present application indicates that essentially no formaldehyde is contained in nor released from the binder composition of the present invention.

95 weight % or more of the starch used as first component of the new binder of the present invention is a native starch with no chemical modification. It may be obtained from vegetable sources such as corn, potatoes, wheat, rice, cassava, soybean or other plants containing high starch content. The native starches are usually available as white powders, which still contain small amounts of non-carbohydrate components such as proteins and salts. They also contain about 10 to 15 weight % humidity, which can be measured according to the method in ISO 1666. In the present application, the native starch weight % values refer to the 'dry' native starch excluding the humidity content.

95 to 100 weight % of the starch used in the binder of the present invention is insoluble in water. It is particularly preferred that all of the starch used in the binder composition of the present invention is water-insoluble. The term 'insoluble in water' as used herein means a solubility of the starch lower than 0.15 g per 100 g of water at 20° C. The solubility can be measured as follows: prepare a homogeneous dispersion of starch in water at 20° C., filter it through a standard laboratory filter paper to get a clear solution, and evaporate 100 g of said clear solution at 135° C. for 120 minutes to obtain a solid residue. The solubility is reported as per the weight of the solid residue in grams contained in the 100 g clear starch solution.

It is preferred that the native starches contained in the binder according to the present invention have a Dextrose Equivalent (DE) lower than 2, more preferable lower than 1.

Non-limiting examples of native starches useful for the binder of the present invention are Meritena 120, Amyzet 150, Meritena 400 or Amyzet 500 from Syral, Maize Starch from Roquette or C*Gel series from Cargill.

The one or more acrylic component(s) used as second component of the new formaldehyde-free binder in the present invention is a curable acrylic resin, an acrylic (co)polymer or a mixture thereof.

In one embodiment of the present invention, the acrylic component used as a component of the formaldehyde-free binder according to the present invention is a curable acrylic resin described in the art. Preferably, the curable acrylic resin comprises at least one acrylic (co)polymer and a polyol. Optionally they can contain esterification catalysts and/or, pH modifiers. The acrylic (co)polymer is a copolymer of ethylene-unsaturated moieties containing at least 10 mol % of acrylic acid, maleic acid or maleic anhydride, and mixtures thereof; preferably polyacrylic acid or copolymers of acrylic and maleic acids. The polyol is an alkane-polyol or alkanolamines of molecular weight lower than 1000 g/mol described in the art, like triethanolamine, glycerol, trimethylolpropane and the like. Non-limiting examples of curable acrylic resin suitable for the new formaldehyde-free binder in the present invention are Aquaset BI700 from Dow Chemicals, Acrodur DS3530 from BASF, or Leaf Free series from Georgia Pacific.

In another embodiment of the present invention, the acrylic component used as second component of the new formaldehyde-free binder in the present invention is an acrylic (co)polymer. Preferably, the acrylic (co)polymer is a copolymer of ethylene-unsaturated moieties containing at least 10 mol % of acrylic acid, maleic acid or maleic anhydride, and mixtures thereof. More preferably the acrylic (co)polymer is polyacrylic acid or copolymers of acrylic and maleic acids. The acrylic (co)polymers are normally available as water solutions, dispersion or powders, which can be dissolved or dispersed in water by mechanical means at temperatures from about 10 to 50° C. Non-limiting examples of acrylic (co) polymers useful for the new binder in the present invention are Syntran 8220 from Interpolymer, Craymul 2154 from Cray Valley, or Acumer 1000 from Dow Chemicals.

In the case that the acrylic component used as second component of the new formaldehyde-free binder in the present invention is an acrylic (co)polymer, it is a more preferred embodiment to combine said acrylic (co)polymer with at least one cross-linker, such as alkane-polyol or alkanolamines of molecular weight lower than 1000 g/mol described in the art, like triethanolamine, glycerol, trimethylolpropane and the like.

The term "aqueous binder composition" as used in the present application means a binder composition that is composed of a solid content and water. Due to the water-insolubility of the water-insoluble native starch, the formaldehyde-free aqueous binder composition of the invention is a dispersion.

The solid content of the aqueous binder compositions is not particularly limited, and depends on its intended application. So, for example, for application of the binder composition in the form of a dispersion to the mineral fibers via spraying it is preferred that the formaldehyde-free binder composition according to the present invention contains a solid content of 4 to 10 weight %. Particularly preferred in this case is a solid content of 5 to 8 weight %. Other application methods of the aqueous binder composition according to the present invention are also possible, for example spreading or immersion. In those cases, other solid content ranges might be more appropriate. Thus, for example, a solid content of 15 to 30 weight %, e.g. 20 weight %, may be more suitable if the binder composition is applied by immersion of the substrate in the aqueous binder composition according to the present invention. Merely for comparison purposes of the properties of the binder compositions through this description and in the examples, a reference solid content of 50 weight % is selected.

The amount of native starch and the amount of acrylic component to be used in the binder of the present invention are not specifically limited. However it is suitable that the amount of native starch is 10 to 95 weight % based on the total solid content of the binder composition, the amount of acrylic component is 5 to 90 weight % based on the total solid content of the binder composition, and the sum of the amount of native starch and the amount of acrylic component is at least 70 weight % based on the total solid content of the binder composition.

According to another preferred embodiment, very useful binder compositions in form of low viscosity dispersions are obtained when the amount of native starch is 25 to 80 weight % based on the total solid content, the amount of acrylic component is 75 to 20 weight % based on the total solid content, and the sum of the amount of native starch and acrylic component is at least 80% with respect to the total solid content of the binder composition.

According to a more preferred embodiment, the amount of native starch is from about 60 to about 90 weight % with respect to the total solid content of the binder composition, the amount of acrylic component is from about 10 to about 40 weight % with respect to the total solid content of the binder composition, and the sum of the amount of native starch and acrylic component is at least 70 weight % with respect to the total solid content of the binder composition.

This above embodiment covers binder compositions that are economically attractive (the acrylic component is normally more expensive than the native starch) and, at the same time, after they are applied and cured on the substrates show good binding strength in dry and wet conditions, and good ageing behavior.

According to another preferred embodiment, the binder composition in the form of a dispersion according to the present invention comprises an amount of native starch of 25 to 50 weight % based on the total solid content, an amount of acrylic component of 75 to 50 weight % based on the total solid content, and the native starch and the acrylic component amounts add at least 90 weight % with respect to the total solid content of the binder composition. Such binder compositions, after being applied and cured on the substrates, result in improved binding strength in wet conditions and improved ageing behavior of the bonded products in humid conditions.

According to a yet more preferred embodiment, the binder composition of the present invention also comprises additives described in the art to enhance the performance for its use for mineral wool. Non-limiting examples of additives are esterification catalysts such as sodium hypophosphite, pH control agent such as ammonium sulfate, hydrophobizing agent such as silicones, de-dusting agent such as paraffin oils, adhesion promoter agent such as alkoxysilanes, fiber softeners, preservatives, dyes and corrosion inhibitors. It is also preferred that the new binder additionally comprises at least one filler or chain extender such as, but not limited to, urea, sugars, molasses, lignosulfonates or tannins.

There is no limitation about the pH of the new binder composition. Nevertheless it is preferred that the pH of the new binder is above 2.

In view of its suitability as a binder composition for mineral fibers, it is particularly preferred that binder composition of the present invention has the following characteristic: when the binder composition has a solid content of 50 weight-%, the viscosity of the binder composition is less than 200 mPa·s at 20° C., and preferably less than 50 mPa·s. at 20° C.

Manufacturing of the New Binder

The process for manufacturing the formaldehyde-free binder composition according to the present invention comprises the steps of:
 (a) preparation of a dispersion of starch, wherein an amount of 95 weight % or more of the starch is water-insoluble native starch, in water at a temperature of 10 to 40° C.;

(b) contacting the dispersion obtained in step (a) with one or more acrylic component(s) and, optionally, further additives, at a temperature of 10 to 40° C.

Preferably, the dispersion step (a) is done with mechanical stirring until obtaining a homogenous mixture. It is important to carry out this step at a temperature between 10 to 40° C., and preferably from about 20 to 30° C. This range of temperature is suitable to disperse the starch in water and low enough to avoiding 'gelatinization' of the starch granules what otherwise would increase the viscosity and difficult the processing. The time of dispersing is not particularly limited because depends on the specific dispersion equipment.

Preferably, the contacting in step (b) is done with mechanical stirring until obtaining a homogenous mixture. It is important to carry out said contacting process at a temperature between 10 to 40° C., and preferably from about 20 to 30° C., for the reasons mentioned above. Additionally, this range of temperature is also suitable to avoid unwanted hydrolysis and solubilization of the native starch. The time of contacting step (b) is not particularly limited. Nevertheless it is preferred to carry out this step in less than 60 minutes. Under these conditions it is possible, for example, to obtain a binder composition having a viscosity below 50 mPa·s at a solid content of 50 weight % solids.

In order to avoid premature reaction and/or gelatinization of the starch and to maintain the binder composition in the form of a dispersion with low viscosity, the temperature during the preparation of the binder composition according to the present invention should be kept below 65° C., preferably below 50° C., and most preferably below 40° C. According to a particularly preferred embodiment of the present invention, the temperature during the process of preparing the binder composition of the present invention is not raised above room temperature. In other words, the un-modified insoluble native starch is applied as such to the fibers as part of the binder composition. The binder composition on the fibers is subsequently dried and cured at temperatures above 100° C.

Alternatively, the process for manufacturing of the new formaldehyde-free binder composition according to the present invention may comprise the step of dispersing starch, wherein an amount of 95 weight % or more of the starch is water-insoluble native starch, in an aqueous mixture containing the acrylic component and, optionally, further additives, at a temperature of 10 to 40° C.

Use of the New Binders for Mineral Wool

The new formaldehyde-free binders according to the present invention are to be used as binder for fibrous substrates, particularly mineral wool fibers. The new binder is applied to the mineral fibers so that they become impregnated. Preferably, the application is via spraying. For the application, the total solid content of the new binder composition is not particularly limited. Nevertheless it is particularly suitable to use an aqueous binder composition wherein the solid content is from between 4 to 10 weight %. The amount of new binder to be applied onto the mineral fibers is not particularly limited and is suitably adjusted depending on the type of mineral wool product. A typical amount of dried binder applied onto the fibers is in the range of 4 to 20 weight % of dried binder with respect to the weight of mineral wool fibers.

Figure 4:
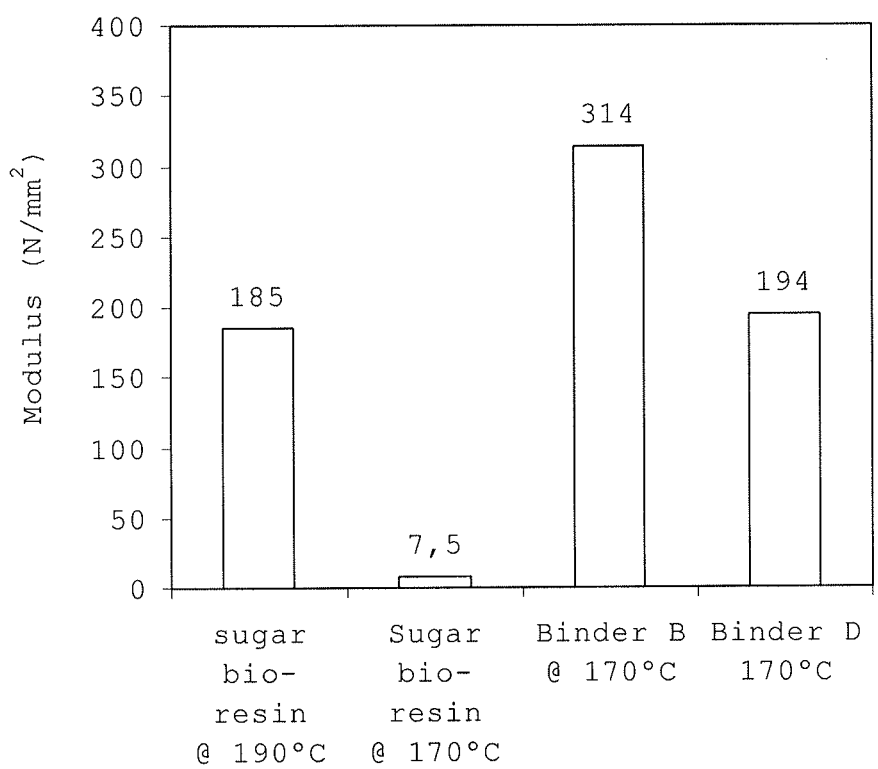
FIG. 4 shows the Young moduli under wet conditions for binders B and D according to the present invention, and bio-resin based on dextrose described in WO 2008/089851 A1 at page 6.

The impregnated fibers are then collected in a forming chamber and then conveyed to a curing oven where the new binder cures to set. The binder composition of the present invention cures at temperatures of above 100° C., preferably at a temperature of 140° C. to 180° C., e.g. at 170° C., which is lower than the curing temperatures required for sugar-based bio-binders described in the art. For instance, the bio-binder described in WO 2008/089851 A1 at page 6 has a curing temperature of 190° C., as seen in FIG. 4. Additionally, the new binder composition of the present invention looses a very low amount of mass during the process of curing, preferable less than 1% at 200° C. This is very suitable to increase the binder efficiency, defined as the amount of binder solids after curing compared to the amount of binder solids applied on mineral fibers. In contrast, sugar-based bio-binders described in the art loose significantly more mass. This deteriorates the binder efficiency. For instance, the bio-binder described in WO 2008/089851 A1 at page 6 looses about 25% mass at 200° C.

The mineral wool mat is afterwards cut and shaped into its final dimensions and packaged. The mineral wool product manufactured with the new binder may comprise at least one additional facing made of paper, aluminum, glass veil or mixtures thereof. The mineral wool product obtained may be used for thermal or acoustic insulation purposes in buildings, conducts, particularly air-conditioning conducts, electrical appliances, ships, aircrafts and spaceships.

EXAMPLES

One example of the first embodiment of the present invention is a binder composed by a mixture of native starch Meritena 120 supplied by Syral and acrylic resin Aquaset BI 700 supplied by Dow Chemicals, at 50 weight % each with respect to the total solid %. Meritena 120 is a native starch derived from corn, with DE close to zero, supplied as a whitish powder containing 12% humidity. Aquaset BI 700 is an acrylic resin based on polyacrylic acid and triethanolamine, supplied as a 55 weight % solids water solution.

A 2.5 liter round-bottom flask is charged with 489 mL of water and a mechanical stirring bar. Then, 511 grams of Meritena 120 powder are added and the mixture vigorously stirred for 30 minutes at 20° C., obtaining a homogenous white dispersion of approximately 45 weight % solids. Afterwards, 818 grams of Aquaset BI 700 were added and the mixture stirred for additional 10 minutes at 20° C. The resulting binder C is a milky dispersion of approximately 50 weight % solids, consisting of a 50:50 solids mixture of starch and acrylic component.

A series of new binders based on mixtures of Meritena 120 and Aquaset BI 700 are provided in Table 1. All of them can be similarly prepared following the method above, by varying the mixing ratio between both components.

TABLE 1

New binders based on mixtures of native starch Meritena 120 and acrylic resin Aquaset BI700. Composition is given in weight % with respect to the total solid %.

| Composition | A | B | C | D |
|---|---|---|---|---|
| Meritena 120 | 20% | 35% | 50% | 70% |
| Aquaset BI700 | 80% | 65% | 50% | 30% |

The bonding strength on mineral fibers of the new binders A to D was measured in a strain-strength test, as per the Young modulus of a glass paper treated with the binder. The treatment of the glass paper consists of impregnating the glass paper with 20 weight % solids of the new binder, and curing for 3 min at 170° C. The modulus measured under these conditions is referred as under 'dry' conditions. The effect of ageing on the bonding properties of the new binders was also evaluated in a consecutive experiment, consisting of immersing the cured treated glass paper specimens in water at 85° C. for 10 minutes, drying and measuring again the Young modulus value in a strain-strength test. The Young modulus measured under these conditions is referred as under 'wet' conditions. The FIG. 1 shows the Young moduli measured under 'dry' and 'wet' conditions for binders A to D, composed of mixtures of native starch Meritena 120 and acrylic resin Aquaset BI 700. As a reference the Young modulus values for native starch Meritena 120 and acrylic resin Aquaset BI 700 on their own measured under the same conditions are also provided. Remarkably, the bonding strength of the new binders under wet conditions is improved in comparison to that of the acrylic resin alone or the native starch alone. The best performing under wet conditions is binder B; i.e. a composition of about 35 weight % of native starch and 65% of acrylic component. The bonding properties under 'dry' conditions for binders A to D are very suitable.

Young modulus is measured on 25×75 mm strips of glass paper type Borosilicate GF/A from Whatman International, impregnated with binder and cured as described above, by using a tensile strength tester set at a constant extension rate of 6 mm/min.

Figure 2:
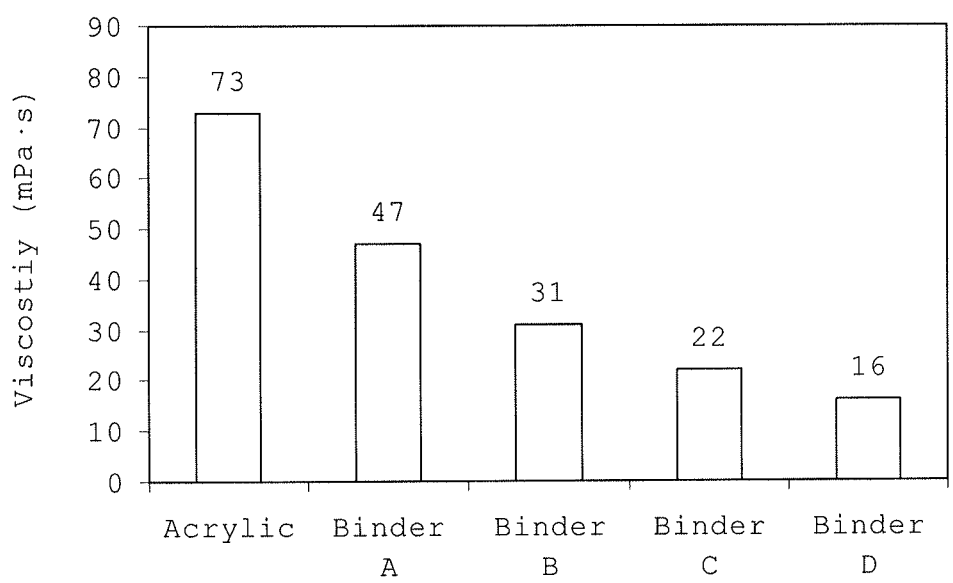
FIG. 2 shows the viscosity of binders A to D according to the present invention, and acrylic resin Aquaset BI700 alone. The viscosity has been measured on aqueous compositions containing a solid content of 50 weight %.

The viscosity of the new binders was measured with a Brookfield viscometer with spindle 1 at 20° C. at a solid content of 50 weight %. The FIG. 2 shows the viscosity for binder A to D, based on mixtures of native starch Meritena 120 and acrylic resin Aquaset BI700, at 50 weight % solids. As a reference, the viscosity of acrylic resin Aquaset BI700 is also provided also at 50 weight % solids. It can be seen that all the binders A to D have a viscosity below 50 mPa·s at 20° C. which is very favorable for their use in mineral wool manufacturing. The starch component has a significant viscosity reduction effect on the high viscous acrylic component.

Figure 3:
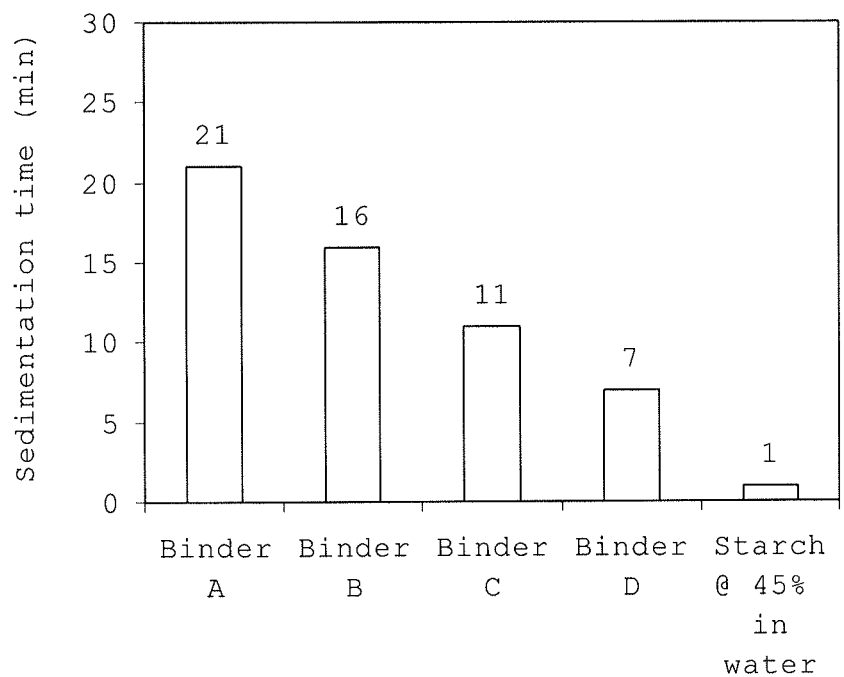
FIG. 3 shows the sedimentation time of binders A to D according to the present invention, and a dispersion of native starch Meritena 120. The sedimentation time has been measured on aqueous compositions containing a solid content of 45 weight %.

The stability of the new binder dispersions was measured visually via sedimentation tests, as the time for a homogeneous mixture to start phase splitting at 20° C. FIG. 3 shows the sedimentation time for binders A to D according to the present invention, based on mixtures of native starch Meritena 120 and acrylic resin Aquaset BI700 at 45 weight % solids. As a reference, the sedimentation time of a homogeneous dispersion of native starch Meritena 120 alone in water is provided. It can be seen that all binder dispersions A to D according to the present invention have an increased stability, with sedimentation time above 5 minutes, in comparison to the low stability of the dispersion of insoluble native starch in water. This is also very suitable for the use of the new binders in mineral wool manufacturing.

The curing temperature of the new binders was compared to other bio-resins using the respective values of the Young modulus under wet conditions. The FIG. 4 shows the Young modulus under wet conditions for the binders B and D according to the present invention, based on mixtures of native starch Meritena 120 and acrylic resin Aquaset BI700, cured for 3 minutes at 170° C. As a reference it has been also measured the Young modulus under wet conditions of a bio-resin composed of dextrose (82%), citric acid (15%) and ammonia (3.1%) (see WO 2008/089851 A1; page 6). In this later case, the bio-resin was cured at 170° C. and 190° C., in both cases for 3 minutes. It can be seen that the binders B and D according to the present invention already achieve mechanical strength curing at 170° C., whereas the bio-resin needs curing at 190° C. to provide sufficient mechanical strength.

Figure 5:
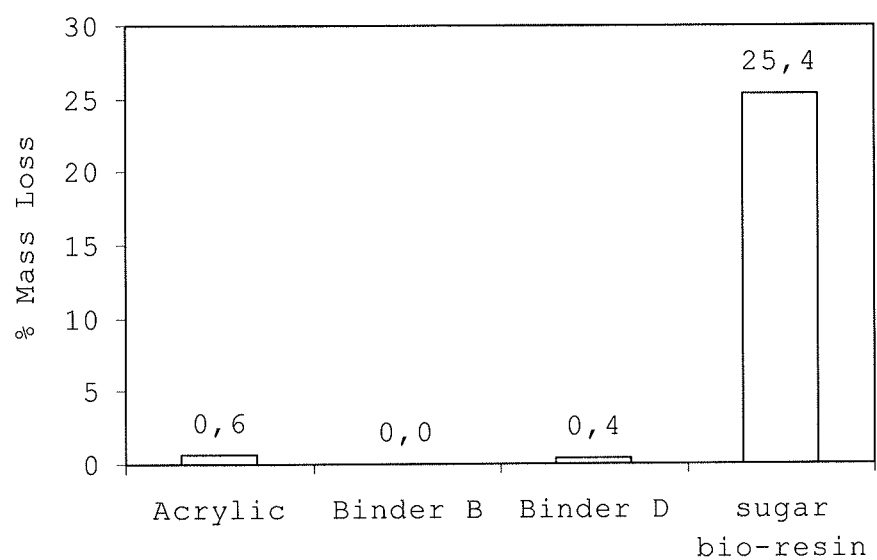
FIG. 5 shows the mass loss (TGA, 10° C./min, % solid losses at 200° C.) for binders B and D according to the present invention, acrylic resin Aquaset BI700, and for bio-resin based on dextrose described in WO 2008/089851 A1 at page 6.

The mass loss % upon curing for the new binders was measured by TGA (Thermal Gravimetric Analysis), as the relative solids content weight diminution at 200° C. using a ramp of 10° C./min in a nitrogen atmosphere. This is representative of the maximum temperatures at which resins are normally exposed during the curing process. The FIG. 5 shows the mass loss of binders B and D according to the present invention. As a comparison, it also shows the mass loss % for the acrylic resin Aquaset BI700 and a bio-resin composed of dextrose (82%), citric acid (15%) and ammonia (3.1%) (described in patent application WO 2008/089851 A1 at page 8). It can be seen that the mass loss, referred as relative solids content weight diminution, for the new binders B and D is less 0.3%, similar to the acrylic resin but significantly lower than the bio-resin based on dextrose, which loses up to 25% mass.

Other new binders according to the present invention are provided in the Table 2, along with the main characteristics. All of them can be produced according to a similar method to the one described above for the Binder C.

TABLE 2

New binders based on mixtures of native starch and acrylic component. Composition is given in weight % with respect to the total solid %.

| Composition | A | B | C | D | E | F | G | H | I | J |
|---|---|---|---|---|---|---|---|---|---|---|
| Meritena 120 [1] | 20% | 35% | 50% | 70% | 46.5% | | | | 64% | 60.5% |
| Maize Starch [2] | | | | | | 35% | 50% | 70% | | |
| Aquaset BI700 [3] | 80% | 65% | 50% | 30% | 47% | 65% | 50% | 30% | | |
| Polyacrylic acid [4] | | | | | | | | | 30% | 27% |
| Triethanolamine | | | | | | | | | 5% | 4% |
| Sodium hypophosphite | | | | | | | | | 1% | 1% |
| Mineral Oil emulsion Hydrowax 296 [5] | | | | | 6% | | | | | 7% |
| Epoxy-trimethylsilane | | | | | 0.5% | | | | | 0.5% |
| Properties | | | | | | | | | | |
| Modulus 'dry' conditions (N/mm²) [6] | 564 | 517 | 519 | 383 | 464 | 506 | 443 | 381 | 492 | 474 |
| Modulus 'wet' conditions (N/mm²) [7] | 279 | 314 | 242 | 194 | 210 | 92 | 72 | 153 | 26 | 151 |
| Viscosity (mPa · s) [8] | 47 | 32 | 25 | 17 | 28 | 40 | 31 | 24 | 150 | 195 |

[1] Supplied by Syral
[2] Supplied by Roquette
[3] Supplied by Dow Chemicals
[4] Supplied by Sigma Aldrich. molecular weight 8000 g/mol, at pH 2.5
[5] Supplied by Sasol
[6] Glass paper impregnated with 20 weight % solids of binder, and cured for 3 min at 170° C.
[7] Glass paper impregnated with 20 weight % solids of binder, and cured for 3 min at 170° C., then submerged in water at 85° C. for 10 minutes, and dried.
[8] Brookfield spindle 1 at 20° C. At 50 weight % solid.
[9] TGA, 10° C./min. Weight loss % at 200° C. vs. initial solids weight % content.

The invention claimed is:

1. A formaldehyde-free aqueous binder composition in the form of a dispersion comprising
   starch, wherein an amount of 95 weight % or more of the starch is water-insoluble native starch, and
   one or more acrylic component(s) selected from the group consisting of polyacrylic acid, copolymers of acrylic and maleic acids, copolymers of ethylene-unsaturated moieties containing at least 10 mol % of acrylic acid, maleic acid or maleic anhydride; salts of any preceding (co)polymers, curable resins based on the preceding (co) polymers, and mixtures thereof.

2. The formaldehyde-free binder composition according to claim 1, wherein the native starch has a DE (Dextrose Equivalent) lower than 2.

3. The formaldehyde-free binder composition according to claim 1, wherein the amount of native starch is 10 to 95 weight %, based on total solid content of the binder composition, the amount of acrylic component is 5 to 90 weight %, based on the total solid content of the binder composition, and the sum of the amount of native starch and the amount of acrylic component is at least 70 weight %, based on the total solid content of the binder composition.

4. The formaldehyde-free binder composition according to claim 1, wherein the acrylic component comprises a curable aqueous resin comprising at least one acrylic (co)polymer and one polyol, wherein
   the acrylic (co)polymer is selected from the group consisting of polyacrylic acid and a copolymer of acrylic and maleic acids, and
   the polyol is selected from the group consisting of polyalkanols and alkanolamines with a molecular weight lower than 1000 g/mol.

5. The formaldehyde-free binder composition according to claim 1, wherein the acrylic component is selected from the group consisting of polyacrylic acid and copolymers of acrylic and maleic acids.

6. The formaldehyde-free binder composition according to claim 5, further comprising a cross-linker.

7. The formaldehyde-free binder composition according to claim 6 wherein the cross-linker comprises polyols with molecular weight lower than 1000 g/mol.

8. The formaldehyde-free binder composition according to claim 1, further comprising additives selected from the group consisting of esterification catalysts, pH control agents, hydrophobizing agents, de-dusting agents, adhesion promoters, fiber softeners, preservatives, dyes, corrosion inhibitors, fillers and chain extenders.

9. A process for manufacturing a formaldehyde-free binder composition comprising the steps of:
   (a) preparing a dispersion of starch, wherein an amount of 95 weight % or more of the starch is water-insoluble native starch, in water at a temperature of 10 to 40° C.; and
   (b) contacting the dispersion obtained in step (a) with an acrylic component at a temperature of 10 to 40° C. selected from the group consisting of polyacrylic acid, copolymers of acrylic and maleic acids, copolymers of ethylene-unsaturated moieties containing at least 10 mol % of acrylic acid, maleic acid or maleic anhydride; salts of any preceding (co)polymers, curable resins based on the preceding (co)polymers, and mixtures thereof.

10. A process for manufacturing a formaldehyde-free binder composition comprising dispersing starch, wherein an amount of 95 weight % or more of the starch is water-insoluble native starch, in an aqueous mixture containing an acrylic component at a temperature of 10 to 40° C. selected from the group consisting of polyacrylic acid, copolymers of acrylic and maleic acids, copolymers of ethylene-unsaturated moieties containing at least 10 mol % of acrylic acid, maleic acid or maleic anhydride; salts of any preceding (co)polymers, curable resins based on the preceding (co)polymers, and mixtures thereof.

11. A process for producing a mineral wool product containing a cured formaldehyde-free binder comprising
   preparing an aqueous binder composition in the form of a dispersion comprising a) starch, wherein an amount of 95 weight % or more of the starch is water-insoluble native starch; and b) one or more acrylic component(s), selected from the group consisting of polyacrylic acid, copolymers of acrylic and maleic acids, copolymers of ethylene-unsaturated moieties containing at least 10 mol % of acrylic acid, maleic acid or maleic anhydride; salts of any preceding (co)polymers, curable resins based on any preceding (co)polymers, and mixtures thereof;
   impregnating mineral fibers of the mineral wool product with the aqueous binder composition with a solid content of 4 to 10 weight %; and
   curing the aqueous binder composition at a temperature above 100° C.

* * * * *